(12) United States Patent
Bergin et al.

(10) Patent No.: US 6,917,880 B2
(45) Date of Patent: Jul. 12, 2005

(54) INTELLIGENT PASSIVE NAVIGATION SYSTEM FOR BACK-UP AND VERIFICATION OF GPS

(75) Inventors: Jameson Bergin, Nashua, NH (US); J. Doss Halsey, Falls Church, VA (US); John Don Carlos, San Diego, CA (US)

(73) Assignee: Information Systems Laboratories, Inc., Vienna, VA (US)

( * ) Notice: Subject to any disclaimer, the term of this patent is extended or adjusted under 35 U.S.C. 154(b) by 0 days.

(21) Appl. No.: 10/615,526

(22) Filed: Jul. 8, 2003

(65) Prior Publication Data

US 2005/0096845 A1 May 5, 2005

Related U.S. Application Data

(63) Continuation-in-part of application No. 09/895,613, filed on Jun. 29, 2001, now Pat. No. 6,593,875.

(51) Int. Cl.[7] .............................................. G01C 21/26
(52) U.S. Cl. ....................... 701/223; 701/207; 342/417; 342/463
(58) Field of Search ................................. 342/413, 417, 342/385, 442–446, 61, 63–62, 70, 450, 453, 462–465; 701/223, 207

(56) References Cited

U.S. PATENT DOCUMENTS

| | | | |
|---|---|---|---|
| 4,215,345 A * | 7/1980 | Frosch et al. ................ 342/465 |
| 4,728,959 A | 3/1988 | Maloney ..................... 342/457 |
| 5,534,876 A | 7/1996 | Erickson ..................... 342/387 |
| 5,583,517 A | 12/1996 | Yokev ......................... 342/457 |
| 5,596,330 A | 1/1997 | Yokev ......................... 342/387 |
| 5,999,131 A | 12/1999 | Sullivan ...................... 342/465 |
| 6,147,646 A * | 11/2000 | Arneson et al. ............. 342/417 |
| 6,185,486 B1 * | 2/2001 | Labounsky et al. ............ 701/15 |
| 6,232,917 B1 * | 5/2001 | Baumer et al. ......... 342/357.13 |
| 6,255,992 B1 * | 7/2001 | Madden ...................... 342/424 |
| 6,580,393 B2 * | 6/2003 | Holt ............................ 342/453 |
| 6,657,549 B1 * | 12/2003 | Avery ..................... 340/825.49 |
| 6,714,782 B1 * | 3/2004 | Monot et al. ................ 455/431 |
| 2002/0009994 A1 * | 1/2002 | Sample ........................ 455/431 |
| 2003/0144007 A1 * | 7/2003 | Johansson et al. .......... 455/456 |

* cited by examiner

*Primary Examiner*—Jacques H. Louis-Jacques
(74) *Attorney, Agent, or Firm*—Nydegger & Associates

(57) ABSTRACT

A passive navigation system for an airborne platform includes an on-board computer having a database that contains preprogrammed information regarding pre-existing ground-based signal emitters (e.g. cell-phone, television and radio broadcast transmitters). For each emitter, the database includes the geolocation of the emitter and identifying signal characteristic(s) of each emitter's signal such as frequency, bandwidth and strength. An antenna array and digital receiver cooperate with the computer on the platform to passively receive signals from the emitters and determine a direction of arrival (DOA) for selected signals. The computer also extracts identifying signal characteristic(s) from selected received signals and matches them against the database information to ascertain the geolocation of the emitter that corresponds to the received signal. The platform location is then calculated from the DOA(s) and emitter geolocations using a triangulation-type algorithm. Also, preprogrammed site-specific terrain scattering information can be compared to observed scattered signals to enhance system accuracy.

22 Claims, 2 Drawing Sheets

INTELLIGENT PASSIVE NAVIGATION SYSTEM FOR BACK-UP AND VERIFICATION OF GPS

This application is a continuation-in-part of application Ser. No. 09/895,613 filed Jun. 29, 2001 now U.S. Pat. No. 6,593,875. The contents of application Ser. No. 09/895,613 are incorporated herein by reference.

FIELD OF THE INVENTION

The present invention pertains generally to navigation systems for airborne platforms such as aircraft. More particularly, the present invention pertains to passive navigation systems that can be used to navigate an airborne platform over a relatively long route of flight. The present invention is particularly, but not exclusively, useful as a secondary passive navigation system that can be used to back-up and verify a primary GPS navigational system.

BACKGROUND OF THE INVENTION

GPS (i.e. a Global Positioning System) is a satellite-based radio navigation, positioning and time transfer system that provides highly accurate navigational information on a continuous global basis to an unlimited number of properly-equipped users. Important aspects of the system are that GPS is unaffected by weather and it provides a worldwide common grid reference system that is based on an earth-fixed coordinate system. Nevertheless, despite these beneficial aspects, GPS is susceptible to system outages, and is subject to jamming and spoofing.

For flight missions that require accurate position identification and precise navigational information for an airborne platform (e.g. an aircraft), GPS is an extremely effective tool. Due to the susceptibilities noted above, however, GPS should not be relied upon as a stand-alone navigational system. Stated differently, redundancy is a desirable attribute for any airborne navigational system. With this in mind, it would be desirable for a back-up navigational system for GPS to have certain features. First, the back-up system should be able to effectively assume the role of the primary system (i.e., GPS) when the latter becomes inoperative or inoperable. Second, and perhaps equally important, a back-up system can be used to verify the operation of the primary system.

Another important attribute for a back-up navigational system is that it be able to operate independently of the primary system it is intended to support. Preferably, such a back-up system not only operates independently of the primary system, it also relies on different physical phenomena for its functionality. This latter attribute is particularly important when jamming or spoofing of the primary system (e.g. GPS) is a distinct possibility.

With the above in mind, a passive system that allows accurate navigation using signals from pre-existing ground based emitters (e.g. television and FM radio broadcast signals, cellular phone system signals and signals from existing military equipment such as radar and communications transceivers) is an attractive candidate for use as a back-up to an airborne GPS system for several reasons. First, but not necessarily the most important reason, is cost. Because such a system contemplates the use of existing ground based emitters, this type of system could be implemented without incurring a large expenditure to establish and maintain emitters to produce navigation signals.

In addition to the intrinsic costs savings described above, a system having the ability to selectively use signals from a large number of diverse ground based emitters is relatively hard to jam. In particular, a system that can select among a population of emitters having a wide range of frequencies and waveform characteristics can continue to function despite the jamming or spoofing of a particular frequency band. In addition, a system having the ability to selectively use signals from a large number of geographically distributed ground based emitters is not easily rendered inoperable by a localized power outage.

Another advantage that is somewhat inherent in a navigation system that functions by receiving and processing signals from pre-existing ground based emitters is that the airborne platform is not necessarily required to transmit any-navigation signals. This can be important in certain applications, for example, when there is a concern that transmitted navigation signals might be used by hostile forces to locate, track and target the airborne platform.

In light of the above it is an object of the present invention to provide an on-board system for identifying the geolocation of an airborne platform that can serve as a relatively precise and accurate back-up navigational system for a GPS system. Another object of the present invention is to provide a passive system for identifying the geolocation of an airborne platform that can function as a stand-alone system. Still another object of the present invention is to provide a system for identifying the position of an airborne platform that is not easily jammed, spoofed or rendered inoperable by a localized power outage on the ground. Yet another object of the present invention is to provide a system for identifying the position of an airborne platform that is accurate, relatively inexpensive to implement and relatively simple to use.

SUMMARY OF THE INVENTION

A passive navigation system for an airborne platform (e.g. aircraft), that in one application can be used to back-up and verify a GPS navigation system, includes a computer that is located on the airborne platform. The computer includes a database loaded with pre-programmed information regarding a plurality of stationary ground-based emitters that are positioned at known geolocations (i.e. emitters of opportunity). For the present invention, the ground based emitters can include, but are not necessarily limited to preexisting signal emitters such as television and FM radio broadcast transmitters, cellular phone system transmitters, personal communications system (PCS) transmitters, and military and commercial radar and communication transmitters.

For each ground-based emitter, the database includes information regarding the geolocation of the emitter. Typically, the geolocation information includes the latitude, longitude and altitude of the emitter. In addition, the database includes information to allow the on-board system to identify the signal transmitted by the emitter. More specifically, the database includes at least one identifying signal characteristic of the particular emitter signal. Identifying signal characteristics that can be pre-programmed into the database can include, but are not necessarily limited to one or more of the following: signal frequency, signal bandwidth, signal waveform and signal strength.

The system further includes an antenna array and a digital receiver, both of which are positioned on the airborne platform. Signals are passively received by the antenna array and then sent to the receiver which communicates with the on-board computer. In functional overview, the antenna array, receiver and computer cooperate to receive signal(s) from one or more emitters, determine a direction of arrival (DOA) for selected received signal(s) and determine the geolocation of each emitter that corresponds to each of the selected received signals. The DOA(s) and emitter geolocation(s) are then processed in an algorithm to determine the geolocation of the airborne platform.

In greater detail, signals received by the antenna array are sent to the digital receiver which then sequentially isolates signals from selected emitters. The isolated signals are then converted into a digital complex data stream which is then communicated to the computer. Next, the computer identifies the emitter (and its geolocation) corresponding to each isolated signal. The computer performs this function by first extracting one or more identifying signal characteristics from the data stream and then matching the extracted identifying signal characteristics with the pre-programmed data in the database. Once matched, the computer downloads the emitter geolocation that corresponds to the identifying signal characteristics from the database.

As indicated above, the computer also calculates a DOA for selected received signals. In one implementation, the computer uses the phase differences between signals received at individual antenna elements within the array to determine DOA. In greater detail, when an emitter signal reaches the array, each individual antenna element will receive the signal at a slightly different phase angle relative to the other individual antenna elements. These phase differences can then be used to determine the DOA for the emitter signal.

Once the DOA and emitter geolocation for one or more received signals has been determined, the computer can then input this information into a triangulation-type algorithm to estimate a geolocation of the airborne platform. If desired, the initial geolocation estimate can be further refined by the system. More specifically, the initial geolocation estimate can be used to identify other emitters in the vicinity of the initial geolocation estimate that can be used to further refine the initial geolocation estimate. The receiver is then configured to scan the frequency bands corresponding to the newly identified emitters. In one implementation, additional emitters are identified to improve positioning accuracy by minimizing the geometric dilution of precision (GDOP) that can occur when the selected emitters are unfavorably grouped, such as when the selected emitters are all located in one place or along one line. Also, the additional emitters can be used to reduce biases caused by multipath propagation of the emitter signals.

In one implementation of the system, the effect of terrain scattering on emitter signals can be used to select the most appropriate emitters. For example, terrain scattering information can be used to select emitters having desirable RF characteristics such as the strongest signal power or the lowest levels of multipath propagation. In addition, the terrain scattering information can be used to reduce biases that are caused by multipath propagation of the emitter signals.

In another aspect of the present invention, terrain scattering information can be used to estimate the geolocation of the airborne platform. More specifically, site-specific terrain scattering information for one or more emitters can be generated using an RF phenomenology algorithm and site specific terrain data. The site-specific terrain scattering information is then compared to observed scattered signals to estimate a geolocation for the airborne platform. In some implementations, this technique can be used to estimate a geolocation using the signal from a single ground-based emitter. In addition, this technique can be used to complement or enhance the above-described process of using a triangulation-type algorithm to estimate an airborne platform geolocation using signal DOA's and emitter geolocations from a plurality of emitters.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
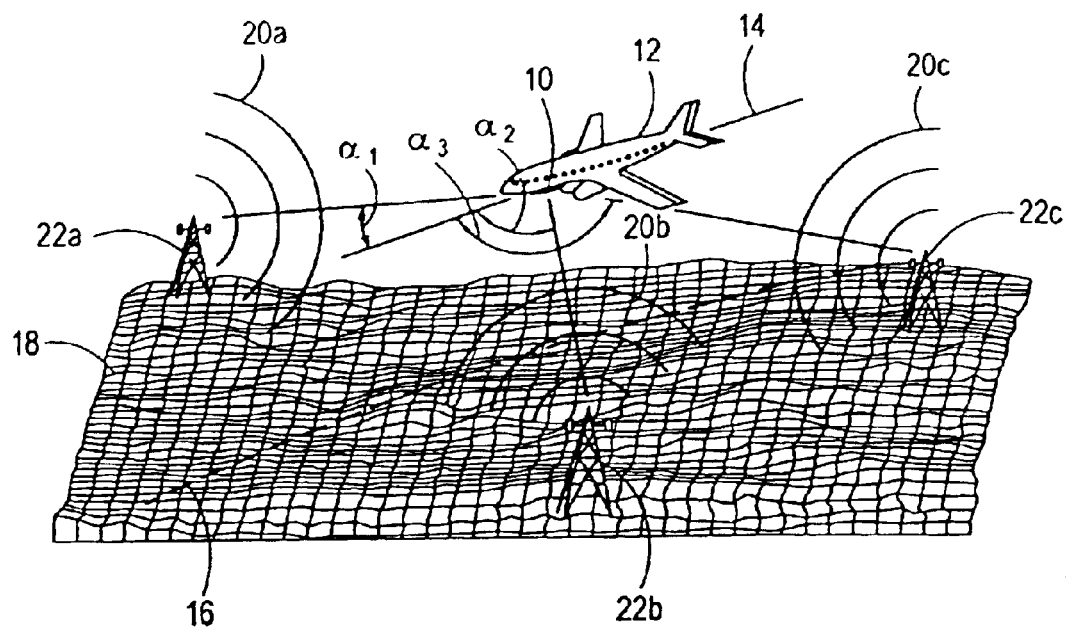
FIG. 1 is a simplified perspective view showing an intelligent passive navigation system mounted on an airborne platform and oriented to receive signals from three exemplary ground-based emitters.

Referring initially to FIG. 1, an intelligent passive navigation system (hereinafter system 10) for determining the geolocation (e.g. latitude, longitude and altitude) of an airborne platform 12 on a flight path 14 is shown. For clarity, a projection 16 of the flight path 14 onto the surface of the earth 18 is also shown. As intended for the system 10, the geolocation of the airborne platform 12 can be initially estimated and subsequently updated as the airborne platform 12 moves to allow the airborne platform 12 to be navigated along a desired course of flight. With the description provided below, those skilled in the pertinent art will appreciate that the system 10 can be used alone as a primary navigation system for an airborne platform 12 or as a secondary navigation system to back-up and verify a primary navigation system, which can be a GPS navigation system or a primary navigation system based on some other technology.

In operational overview as shown in FIG. 1, the system 10 receives radiofrequency (RF) signals, such as exemplary signals 20a–c, from respective stationary ground-based emitters, such as emitters 22a–c that are positioned at known geolocations. An advantageous functional aspect of the system 10 is that the emitters 22a–c can be pre-existing signal emitters that have not been modified or specifically tailored for use in a navigation system. Examples of suitable emitters 22a–c for the system 10 include but are not limited to television and FM radio broadcast transmitters, cellular phone system transmitters, personal communications system (PCS) transmitters, and military and commercial radar and communication transmitters.

Continuing with FIG. 1, it can be seen that emitters 22a–c generate respective signals 20a–c that are passively received for processing by the system 10. As implied above, one or more of the signals 20a–c are typically communication signals or radar signals that are transmitted for receipt by one or more receivers (e.g. television sets, radio sets, radar transceivers) that are not part of the system 10. As used herein, the term communication signal and its derivatives means a radiofrequency signal that is modulated with non-navigation information and includes but is not limited to television broadcast signals, FM radio broadcast signals, cellular phone system signals, personal communications system (PCS) signals, and includes both military and commercial communication signals.

Although three emitters 22 are shown in FIG. 1, those skilled in the pertinent art will appreciate that this number is merely exemplary and that more or less than three signals 20 can be received by the system 10. In fact, as detailed further below, the performance of the system 10 typically increases with the receipt and processing of each additional signal 20. Furthermore, although the system 10 can be designed for use solely with pre-existing emitters 22 as described above (i.e. communication and radar emitters) it is to be appreciated that these signals 20 can be augmented with signals from pre-existing navigation signal emitters. Additionally, dedicated system emitters (not shown) can be positioned at known locations and used to supplement the signals 20 from preexisting emitters 22.

Figure 2:
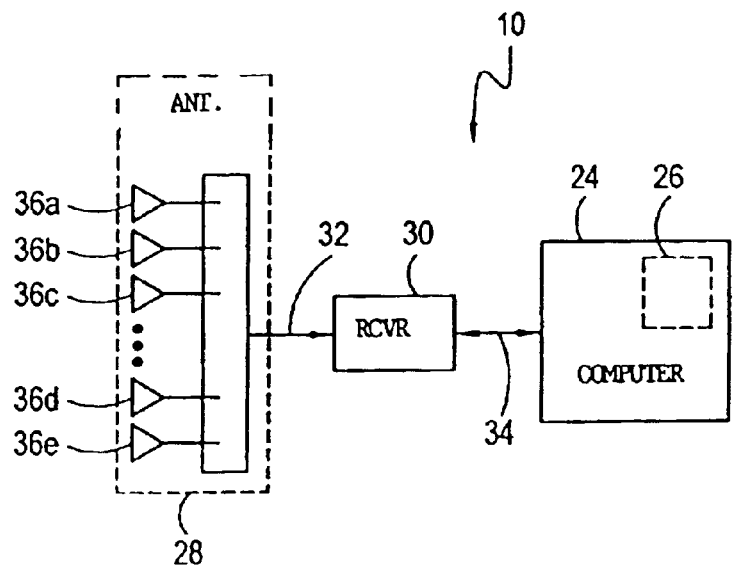
FIG. 2 is a simplified schematic diagram showing the components of an intelligent passive navigation system for use in determining the geolocation of an airborne platform.

A better understanding of the components of the system 10 can be appreciated with cross reference to FIGS. 1 and 2. As shown, the system 10 includes a computer 24 having a database 26. For the system 10, the computer 24 can include one or more processors for performing instructions stored or carried on one or more machine readable media. Suitable processors include, but are not limited to, programmed general purpose digital computers, microprocessors, digital signal processors (DSP), integrated circuits, application specific integrated circuits (ASIC's), logic gate arrays and switching arrays.

Suitable machine readable media include, but are not limited to, RAM, disk drives, optical discs such as a compact disk (CD), CD-ROM, CD-R (a recordable CD-ROM that can be read on a CD-ROM drive), CD-RW (multiple-write CD), CD-E (recordable and erasable CD), or DVD (digital video disc). Alternatively, instead of, or in addition to an optical disc, the machine readable media can include one or more of the following: a magnetic data storage diskett (floppy disk), a Zip disk, DASD storage (e.g., a conventional "hard drive" or a RAID array), magnetic tape, RAM, electronic read-only memory (e.g., ROM, EPROM, or EEPROM), paper punch cards, or transmission media such as digital and/or analog communication links.

Figure 3:
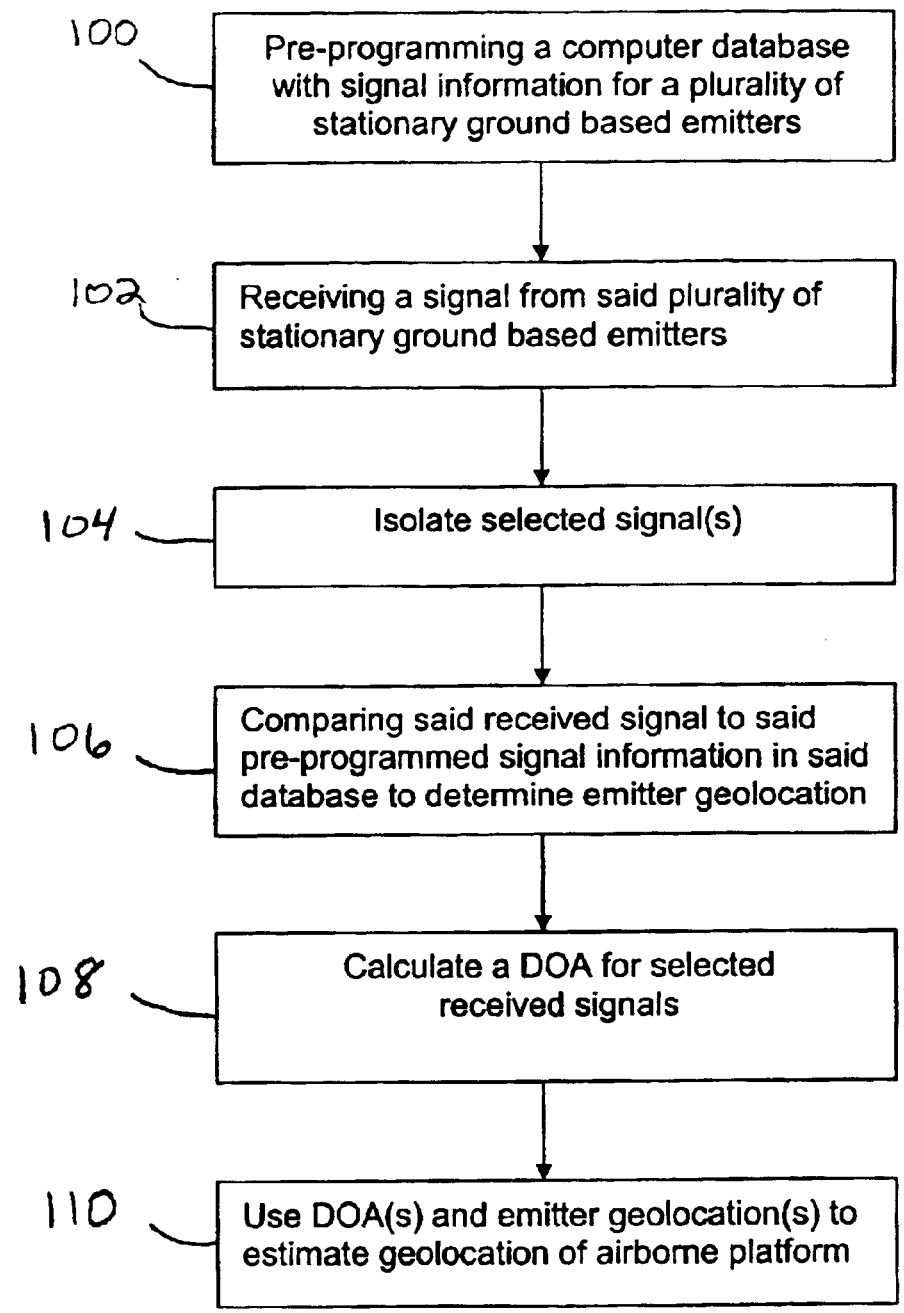
FIG. 3 is a flow chart diagram illustrating a method for passive navigation.

For the system 10, the database 26 is pre-programmed with information regarding each emitter 22 (and its respective signal 20) that is accessible and usable by the system 10 (see also box 100, FIG. 3). In greater detail, the database 26 includes information regarding the geolocation of each ground-based emitter 22. Typically, the geolocation information includes the latitude, longitude and altitude of the emitter 22, but it is to be appreciated that some other coordinate system can be used to identify the geolocation of each emitter 22. Additionally, the database 26 includes information to allow the system 10 to identify each signal 20 distinctly from the other signals 20. More specifically, the database 26 includes at least one identifying signal characteristic, which is typically a characteristic operating factor of the particular signal 20. Identifying signal characteristics that can be pre-programmed into the database 26 can include, but are not necessarily limited to one or more of the following: signal frequency, signal bandwidth, signal waveform and signal strength. Thus, using the database 26, the computer 24 can use an identifying signal characteristic of a signal 20 to determine the geolocation of the emitter 22 that has transmitted the particular signal 20.

As further shown, the system 10 further includes an antenna array 28 and a digital receiver 30, both of which are positioned on the airborne platform 12. Signals 20 are passively received by the antenna array 28 and then sent to the receiver 30 via link 32 (see also box 102, FIG. 3). The receiver 30 communicates with the on-board computer 24 via link 34. In functional overview, the antenna array 28, receiver 30 and computer 24 cooperate to receive signals 20 from one or more emitters. 22, determine a direction of arrival (DOA) for selected received signals 20 and determine the geolocation of each emitter 22 that corresponds to each of the selected received signals 20. The DOA(s) and emitter geolocation(s) are then processed by the computer 24 in an algorithm to determine the geolocation of the airborne platform 12.

In greater detail, signals 20 received by the antenna array 28 are sent to the digital receiver 30 which scans by frequency and then sequentially isolates selected signals 20 from selected emitters 22 (see also box 104, FIG. 3). The isolated signals 20 are then converted into a digital complex data stream which Is then communicated to the computer 24 via link 34. Thus, the receiver 30 includes a frequency scanning capability that is typically controlled by inputs to the receiver 30 from the computer 24 via link 34. Additionally, the receiver 30 includes an analog to digital (A/D) conversion circuit to create the digital complex data stream. Typically, the receiver 30 also Includes the capability of determining a center frequency for each selected received signal 20 and includes the center frequency in the digital complex data stream.

The computer 24 receives the digital complex data stream from the receiver 30 and extracts one or more identifying signal characteristics from the data stream. The computer 24 is programmed to query the pre-programmed data in the database 26 for the extracted identifying signal characteristics. The query results in the database record for the selected emitter signal 20 which includes the emitter geolocation that corresponds to the selected signal 20 (see also box 106, FIG. 3). This process is continued until an emitter geolocation is determined for each selected signal 20.

As indicated above, the computer 24 also calculates a DOA for selected received signals 20 (see also box 108, FIG. 3). FIG. 1 shows a typical implementation in which directions of arrival $\alpha_1$, $\alpha_2$, $\alpha_3$ for respective signals 20*a*, 20*b* and 20*c* are measured relative to a suitable reference line, in this case a line corresponding to the flight path 14. In some implementations, each direction of arrival, a, is measured in terms of components such as a horizontal and vertical component. To measure the DOA for each selected signal 20, the antenna array 28 for the system 10 includes a plurality of antenna elements 36 (e.g. individual antennas) of which exemplary antenna elements 36*a*–*e* have been labeled. In one implementation, the computer 24 is programmed to use the phase differences between signal portions arriving at individual antenna elements 36 within the antenna array 28 to determine the DOA for the selected signal 20. In greater detail, when a signal 20 reaches the antenna array 28, each antenna element 36 will receive a signal portion that is at a slightly different phase angle relative to signal portions received at the other individual antenna elements 36. These phase differences can then be processed to determine the DOA for the selected signal 20. As an alternative to using an antenna array 28 with multiple antenna elements 36, the system 10 could employ a scanning single element antenna (not shown) to measure phase at several scan angles to determine a DOA.

The DOA and emitter geolocation for each selected signal 20 provides position information for the airborne platform 12 (see also box 110. FIG. 3). The DOA and emitter geolocation for two or more selected signals 20 can be processed by the computer 24 using a triangulation-type algorithm to estimate a geolocation of the airborne platform 12. In a typical embodiment, three or more selected signals 20 are processed by the computer 24 using a triangulation-type algorithm to obtain an initial geolocation estimate.

In some implementations of the system 10, the initial geolocation estimate is refined by using the initial geolocation estimate to identify other useful emitters 22 in the vicinity of the initial geolocation estimate. The computer 24 then communicates the frequency/frequency band of the newly identified emitters 22 to the receiver 30 along with instructions for the receiver 30 to scan for the signals 20 from the newly identified emitters 22. The additional emitters 22 can be used to improve positioning accuracy by minimizing the geometric dilution of precision (GDOP) that can occur when the selected emitters 22 are unfavorably grouped, such as when the selected emitters 22 are all located substantially in one place or substantially along one line. Also, the additional emitters 22 can be used to provide an averaging mechanism to reduce biases caused by multi-path propagation of the emitter signals 20. For example, the strongest signals 20 received can be used to determine a coarse, initial geolocation for the platform 12 followed by using the initial geolocation to select weaker signals 20 from advantageously located emitters 22. These weaker signals 20 are then processed to improve the geolocation estimation by minimizing GDOP and multipath propagation bias.

The system 10 can also utilize the effect of terrain scattering on the signals 20 to select the most appropriate signals 20 for processing. For example, terrain scattering information can be used to select signals 20 having desirable RF characteristics such as the strongest signal power or the lowest levels of multipath propagation. In addition, the terrain scattering information can be used to reduce biases that are caused by multipath propagation of the signals 20.

In another embodiment of the system 10, terrain scattering information can be used to estimate the geolocation of the airborne platform 12. In this embodiment, site-specific terrain information is pre-programmed into the database 26. For example, data from the National Imagery and Mapping Agency (NIMA) Digital Terrain Elevation Data (DTED) and NIMA Digital Feature Analysis Data (DFAD) can be used. Next, site-specific terrain scattering information can be generated by the computer 24 by processing the site-specific terrain information in a radio frequency (RF) phenomenology algorithm. The site-specific terrain scattering information is then compared with observed scattered signals to estimate a geolocation for the airborne platform 12. The site-specific terrain scattering information typically includes a mapping of scattered signal data (e.g. scattered signal power) as a function of geolocation. In some implementations of this embodiment, the technique can be performed using the scattered signals from a single ground-based emitter 22.

While the particular Intelligent Passive Navigation System for Back-up and Verification of GPS as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for implementing a passive navigation system for an air vehicle which comprises the steps of:
   providing a database for a plurality of emitters, wherein the database includes information regarding the geolocation of each emitter in the database, and information regarding at least one characteristic operating factor contained in signals transmitted by a respective emitter;
   receiving a signal from at least one emitter, said signal originating at a distance from the air vehicle;
   isolating the signal received from the emitter;
   processing the received signal using operating factor information in the database to establish an identity of the emitter;
   evaluating the geolocation information for the identified emitter in the database to estimate a direction of arrival for the air vehicle to the identified emitter; and
   using the emitter identity and direction of arrival to determine a course location of the air vehicle for use in navigation.

2. A method as recited in claim 1 wherein a plurality of signals are received in the receiving step and each signal from a respective emitter is separated from other received signals in the isolating step.

3. A method as recited in claim 1 wherein the geolocation information includes a latitude, a longitude and an altitude (height) for respective emitters.

4. A method as recited in claim 1 wherein the operating factor information includes frequency, bandwidth, waveform and signal strength data.

5. A method as recited in claim 4 wherein the processing step comprises the step of scanning the operating factor information for a range of frequencies.

6. A method as recited in claim 4 wherein the processing step comprises the step of extracting emitters having signal strengths below a predetermined threshold.

7. A method as recited in claim 1 wherein the receiving step is accomplished passively.

8. A method as recited in claim 1 wherein each emitter is an emitter-of-opportunity.

9. A method for determining position information for an airborne platform, said method comprising the steps of:
   pre-programming a computer database with signal information for a plurality of signals from a respective plurality of stationary ground based emitters;
   receiving a signal from said plurality of stationary ground based emitters, said signal originating at a distance from the airborne platform, wherein said signal is selected from the group of signals consisting of a communication signal and a radar signal; and
   comparing said received signal to said pre-programmed signal information in said database to determine position information for the airborne platform.

10. A method as recited in claim 9 wherein said signal information is selected from the group of signal information consisting of frequency, bandwidth, waveform, signal strength, site-specific terrain scattering information and combinations thereof.

11. A method as recited in claim 9 further comprising the steps of:
   pre-programming said computer database with an emitter geolocation for each said stationary ground based emitter;
   determining a direction of arrival (DOA) for said received signal;
   and wherein said step of comparing said received signal to said signal information in said database is used to determine said emitter geolocation for said received signal and said position information for the airborne platform is determined relative to said emitter geolocation for said received signal using said DOA.

12. A method as recited in claim 9 wherein said emitter geolocation includes a latitude, a longitude and an altitude.

13. A method as recited in claim 9 wherein said received signal generates scattered signals, said signal information comprises site-specific terrain scattering information, and said comparing step matches said scattered signals of said received signal with said site-specific terrain scattering information to determine position information for the airborne platform.

14. A method as recited in claim 9 wherein said communication signal is selected from the group of communication signals consisting of a television broadcast signal, an FM radio broadcast signal, a cellular phone system signal and a personal communications system (PCS) signal.

15. A passive navigation system for an airborne platform, said system comprising:
- means for receiving a plurality of signals from a respective plurality of stationary ground based emitters located at a plurality of respective geolocations with at least one said received signal selected from the group of signals consisting of a communication signal and a radar signal, said signal originating at a distance from the airborne platform;
- a computer positioned on said platform, said computer having a database pre-programmed with each said emitter's geolocation and at least one signal identification characteristic for each said signal;
- a means for selecting at least one signal from said received signals and determining a direction of arrival (DOA) for each said selected signal;
- a means for comparing each said selected signal to said preprogrammed signal identification characteristics in said database to determine a signal emitter geolocation for each said selected signal; and
- a means for using each said signal emitter geolocation and each said DOA to estimate a geolocation for the airborne platform.

16. A passive navigation system as recited in claim 15 wherein said at least one signal identification characteristic is selected from the group of signal identification characteristics consisting of frequency, bandwidth, waveform and signal strength.

17. A passive navigation system as recited in claim 15 wherein said receiving means comprises an antenna array having a plurality of antenna elements.

18. A passive navigation system as recited in claim 15 wherein said database is pre-programmed with site-specific terrain scattering information for at least one said emitter signal, said terrain scattering information for use by said selecting means to select signals having a predetermined RF characteristic.

19. A passive navigation system as recited in claim 15 wherein each said emitter's geolocation includes a latitude, a longitude and an altitude.

20. A passive navigation system as recited in claim 15 wherein at least three received signals are selected by said selecting means.

21. A passive navigation system as recited in claim 15 wherein said system further comprises a means for converting said selected signals into a digital complex data stream for use by said comparing means.

22. A passive navigation system as recited in claim 15 wherein said communication signal is selected from the group of communication signals consisting of a television broadcast signal, an FM radio broadcast signal, a cellular phone system signal and a personal communications system (PCS) signal.

* * * * *

UNITED STATES PATENT AND TRADEMARK OFFICE
CERTIFICATE OF CORRECTION

PATENT NO.    : 6,917,880 B2  
DATED         : July 12, 2005  
INVENTOR(S)   : Jameson Bergin, Doss Halsey and John Don Carlos It is certified that error appears in the above-identified patent and that said Letters Patent is hereby corrected as shown below:

Column 6,
Line 44, delete "a" insert -- α --.

Column 8,
Line 8, delete "of" insert -- for --.

Signed and Sealed this

Eleventh Day of October , 2005

JON W. DUDAS
*Director of the United States Patent and Trademark Office*